United States Patent
Kadambalil Baby et al.

(10) Patent No.: US 9,158,818 B2
(45) Date of Patent: Oct. 13, 2015

(54) FACILITATING IDENTIFICATION OF STAR SCHEMAS IN DATABASE ENVIRONMENTS

(75) Inventors: Geemon Kadambalil Baby, Bangalore (IN); Mahesh Jayashankar, Bangalore (IN); Paolo Fragapane, Stoke Bishop (GB); Suresh Mali, Bangalore (IN); Mike Durran, North Somerset (GB); Ashish Mittal, Tracy, CA (US); James Steadman, Combe Down (GB)

(73) Assignee: Oracle International Corporation, Redwood Shores, CA (US)

(*) Notice: Subject to any disclaimer, the term of this patent is extended or adjusted under 35 U.S.C. 154(b) by 1565 days.

(21) Appl. No.: 11/696,730

(22) Filed: Apr. 5, 2007

(65) Prior Publication Data

US 2008/0249985 A1 Oct. 9, 2008

(51) Int. Cl.
*G06F 7/00* (2006.01)
*G06F 17/00* (2006.01)
*G06F 17/30* (2006.01)

(52) U.S. Cl.
CPC .................. *G06F 17/30498* (2013.01)

(58) Field of Classification Search
CPC ................................ G06F 17/30498
See application file for complete search history.

(56) References Cited

U.S. PATENT DOCUMENTS

| | | | | |
|---|---|---|---|---|
| 5,848,408 A * | 12/1998 | Jakobsson et al. | ............ | 707/714 |
| 5,960,428 A * | 9/1999 | Lindsay et al. | ........................ | 1/1 |
| 6,105,020 A * | 8/2000 | Lindsay et al. | ........................ | 1/1 |
| 6,212,524 B1 * | 4/2001 | Weissman et al. | ............ | 707/600 |
| 6,976,015 B2 * | 12/2005 | Kumar et al. | .................. | 707/714 |
| 7,080,090 B2 * | 7/2006 | Shah et al. | ...................... | 707/605 |
| 7,146,375 B2 * | 12/2006 | Egilsson et al. | ............... | 707/605 |
| 7,194,449 B2 * | 3/2007 | Miao | ..................... | 1/1 |
| 7,379,951 B2 * | 5/2008 | Chkodrov et al. | ............. | 707/605 |
| 7,536,379 B2 * | 5/2009 | Purcell | ................. | 1/1 |
| 7,546,312 B1 * | 6/2009 | Xu et al. | ............... | 1/1 |
| 7,716,173 B2 * | 5/2010 | Stolte et al. | .................... | 707/600 |
| 2002/0194154 A1 * | 12/2002 | Levy et al. | ......................... | 707/1 |
| 2003/0229652 A1 * | 12/2003 | Bakalash et al. | .............. | 707/200 |
| 2004/0122844 A1 * | 6/2004 | Malloy et al. | .................. | 707/102 |
| 2005/0065939 A1 * | 3/2005 | Miao | ..................... | 707/100 |
| 2007/0073759 A1 * | 3/2007 | El-Sabbagh | ................... | 707/102 |
| 2007/0130116 A1 * | 6/2007 | Cras et al. | ......................... | 707/2 |
| 2008/0278334 A1 * | 11/2008 | Friedlander et al. | ........ | 340/573.1 |
| 2009/0112793 A1 * | 4/2009 | Ahmed | .............. | 707/2 |

OTHER PUBLICATIONS

Raghunath Othayoth Nambiar, The Making of TPC-DS, 2006, VLDB Endowment, Proceedings of the 32nd international conference on Very large data bases, pp. 1049-1058.*

(Continued)

*Primary Examiner* — Taelor Kim
(74) *Attorney, Agent, or Firm* — IPHorizons PLLC; Narendra Reddy Thappeta

(57) ABSTRACT

Facilitating identification of star schemas in database environments. In an embodiment, queries directed to relational database tables (organized according to normalized schema) are examined to determine the relationships specified in the queries. A star schema is then generated by including the specified relationships. A data warehouse may be organized according to the generated star schema and the data previously stored in the database tables may be copied to the data warehouse.

16 Claims, 9 Drawing Sheets

(56) References Cited

OTHER PUBLICATIONS

Vivekanand Gopalkrishnan et al., Star/Snow-flake Schema Driven Object-Rational Data Warehouse Design and Query Processing Strategies, 1999, Springer-Verlag Berlin Heidelberg, LNCS 1676, pp. 11-22.*

Qiang Zhu et al, Optimizing Large Star-Scehma Queries with Snowflakes via Heuristic-based Query Rewriting, 2003, IBM Press, 2003 conference, pp. 279-293.*

Luca Cabibbo et al., Querying Multidimensional Databases, Springer Berlin/Heidelberg, v.1369/1998, pp. 319-335.*

Michael Krippendorf, The Translation of Star Schema into Entity-Relationship Diagrams, Sep. 1997, Drexel University: Database and Expert Systems Applications, 1997, Eighth International Workshop, pp. 390-395.*

Craig Utley "Designing the Star Schema Database," "http://www.ciobriefings.com/whitepapers/StarSchema.asp," pp. 1-12,Downloaded Date: Aug. 12, 2006.

* cited by examiner

```
421: SELECT country.country_name, YEAR(times.transaction_date), SUM (budget.target_sales)
422:   FROM budget, country, times
423:   WHERE country.cntry_key = budget.cntry_key AND times.time_key = budget.time_key
424:   GROUP BY country_name, YEAR(times.transaction_date)

441: SELECT region.region_name, times.transaction_date, SUM (sales.sales)
442:   FROM sales, region, times
443:   WHERE region.region_key = sales.region_key AND times.time_key = sales.time_key
444:   GROUP BY region.region_name, YEAR(times.transaction_date)
```

*FIG. 4A*

FACILITATING IDENTIFICATION OF STAR SCHEMAS IN DATABASE ENVIRONMENTS

BACKGROUND

1. Technical Field

The present disclosure relates to data management systems, and more specifically for facilitating identification of star schemas in database environments.

2. Related Art

A database generally refers to a collection of data that is organized to facilitate easy access, update and management of the data using queries. In case of relational databases, the queries are specified in a language such as Structured Query Language (SQL). The data of interest is generally organized in the form of tables, and the definition of the structure (i.e., columns, the type of data that can be stored in each column) of all such tables is referred to as a schema.

Processing queries often requires joins of multiple tables at least in contexts when the required data is stored in different tables. In general, there is overhead (example, processing and/or retrieval) associated with joins, which could be of particular concern when the database is to be used for large number of retrievals.

Star schema (also known as a star join schema) refers to a type of schema in which tables are designed with redundancy of data. Star schemas organize data in terms of fact tables and dimension tables, with fact tables containing detailed data of interest (e.g., aggregated information or detailed counts, etc.). Due to such organization as fact tables and dimension tables, later retrieval of related data is simplified, thereby making star schemas suitable for environments requiring analysis of data.

BRIEF DESCRIPTION OF THE DRAWINGS

Example embodiments of the present invention will be described with reference to the accompanying drawings briefly described below.

FIG. 4A depicts queries of interest executed in a database in an embodiment.

In the drawings, like reference numbers generally indicate identical, functionally similar, and/or structurally similar elements. The drawing in which an element first appears is indicated by the leftmost digit(s) in the corresponding reference number.

DESCRIPTION OF EXAMPLE EMBODIMENTS

1. Overview

An aspect of the present invention facilitates the identification of star schemas in a database environment. In an embodiment, a query designed for operation on a database is examined to determine a required join of two tables, and a relationship between the two tables is included in a star schema. The query may be further examined for a common table in multiple joins, and the common table is set as a fact table in the star schema. The remaining tables of such multiple joins are set as dimension tables in the star schema.

According to another aspect of the present invention, multiple mini-star schemas are formed by processing corresponding number of queries, and mini-stars may be merged if a common dimension table exists in the mini-star schemas. The common dimension table is used as a single node linking the mini-star schemas. The resulting merged schema represents the star schema sought to be generated from the normalized schema of the database.

In an embodiment, a first table of the database not present in any of the mini-star schemas is determined and is added as a dimension table with a relationship to a second table to the star schema if the second table is indicated to have a relationship with the first table in the database.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the features of the invention.

2. Example Environment

Figure 1:
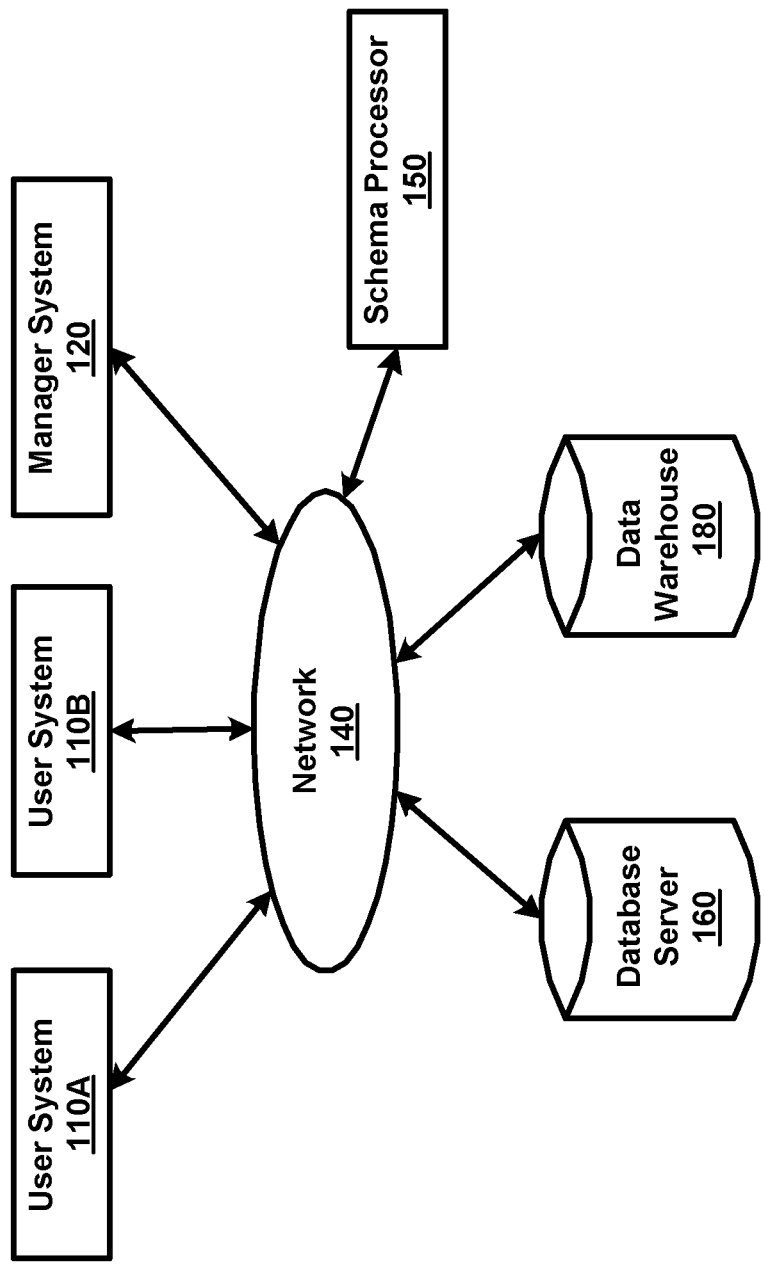
FIG. 1 is a block diagram illustrating an example environment in which several aspects of the present invention can be implemented.

FIG. 1 is a block diagram illustrating an example environment in which several aspects of the present invention can be implemented. The block diagram is shown containing user systems 110A-110B, manager system 120, network 140, schema processor 150, database server 160 and data warehouse 180. Merely for illustration, only representative number/type of systems are shown in the Figure. Many environments often contain more/less systems, both in number and type. Each system of FIG. 1 is described below in further detail.

Network 130 provides necessary communication between various user systems 110A-110B, manager system 120, schema processor 150, database server 160 and data warehouse 180. Network 130 may be implemented using protocols such as TCP/IP well known in the relevant arts.

Each of user systems 110A-110B represents a system such as a personal computer, workstation, mobile station, etc., which enables users to generate requests to database server 160. In the case of relational database related technologies, the requests can be in the form of SQL queries.

On the other hand, manager system 120 (though similar to the user systems) enables managers (or any users, in general) to send queries (representing requests) based on star schemas. The requests may be generated using appropriate interfaces.

Both database server 160 and data warehouse 180 facilitate storage and retrieval of a collection of data using structured queries such as SQL in the case of relational database technologies. Database server 160 may be designed to operate based on both normalized and star schemas. On the other hand, data warehouse 180 may operate on star schemas.

Database server 160 receives requests from users (using one of user systems 110A-110B) for accessing/manipulating the data (typically affecting a single table) such as adding new data, updating/deleting existing data stored in database server 160. As such, the data in database server 160 may be organized in the form of tables and relationships.

Database server 160 may also support a logical view of the stored data in the form of star schemas, thereby facilitating a manager/user to query the underlying data from manager system 120.

Data warehouse 180 stores data organized as a star schema (containing fact tables and dimension tables) and thus is capable of processing the requests from a manager (using manager system 120). It may be appreciated that the same data may exist both in database server 160 and data warehouse 180. Such a scenario may occur when transactional data is maintained in database server 160 for a period of time, which is then moved to data warehouse 180 as historical data (consistent with a star schema in data warehouse 180).

For example, an online seller of items may maintain the daily transactions (sale of items) as transactional data in database server 160, and then move the transactional data accumulated over a period of a month (as daily/weekly sales) to data warehouse 180 as historical data.

At least from the above, it may be appreciated that there may be several scenarios in which star schemas need to be identified in database environments. For example, to facilitate analysis of data on database server 160 from manager system 120, it maybe desirable to provide a logical view of data stored in database server 160 in the form of a star schema. Such a need may be accentuated when there are a large number of databases in database server 160. As another example, to facilitate moving of data from database server 160 to data warehouse 180, the star schemas may need to be identified in database server 160 as an early step in movement of data.

Schema processor 150 facilitates identification of star schemas for the databases in database server 160 as described with examples below.

3. Identifying Star Schemas

Figure 2:
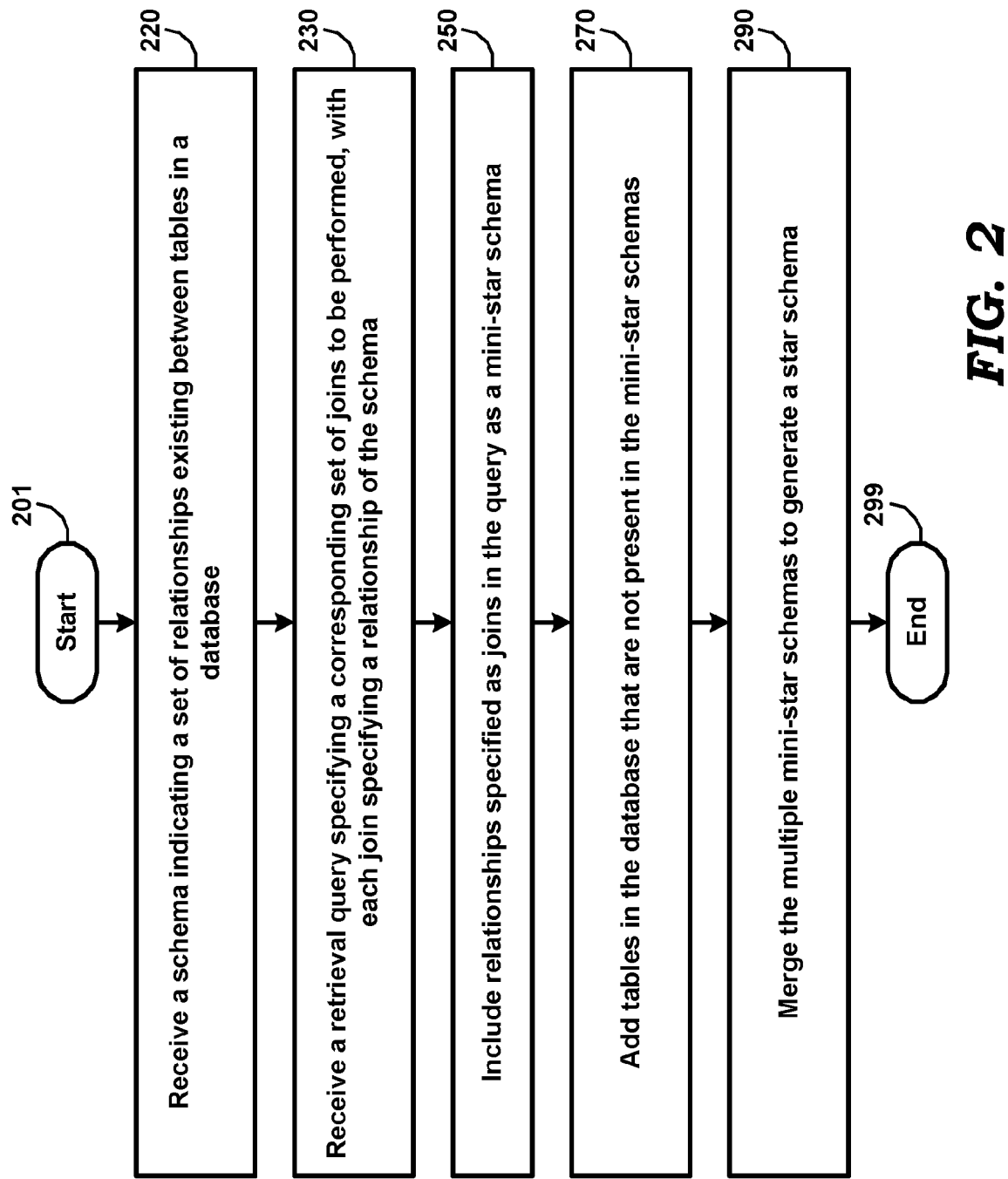
FIG. 2 is a flowchart illustrating the manner in which identification of star schemas in database environments is facilitated according to an aspect of the present invention.

FIG. 2 is a flowchart illustrating the manner in which identification of star schemas in database environments is facilitated according to an aspect of the present invention. The flowchart is described with respect to FIG. 1 merely for illustration. However, various features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited in the specific environment, as will be apparent to one skilled in the relevant arts. Many of such implementations are contemplated to be covered by several aspects of the present invention. The flow chart begins in step 201, in which control immediately passes to step 220.

In step 220, schema processor 150 receives a schema indicating a set of relationships existing between tables in a database in database server 160. The tables and the relationships among the tables may be received in the form of metadata representing the database.

In step 230, schema processor 150 receives a retrieval query specifying a corresponding set of joins to be performed, with each join specifying a relationship of the schema. A retrieval query is designed to retrieve data from one or more tables (for systems from which the query originated) based on potentially some criteria. A join typically refers to a database operation (specified in SQL) that enables data in multiple tables to be retrieved using a common column specifying a relationship.

In step 250, schema processor 150 includes relationships specified as joins in the query as a mini-star schema. A mini-star schema thus specifies tables and the corresponding relationships, as specified by the joins in the query. If there are multiple relationships with a common table, the common table may be identified as a fact table and the remaining tables as dimension tables. Though not depicted in the Figure, multiple mini-stars may be generated corresponding to multiple queries, and thus steps 230 and 250 may be repeated for each retrieval query.

Schema processor 150 after identifying the mini-star schemas, may inspect the mini-star schemas to determine whether all the tables in the normalized schema are present in the mini-star schemas. Control passes to step 290 if all the tables are present and to step 270 otherwise.

In step 270, schema processor 150 adds each table in the database that are not already present in the mini-star schemas. A first table of the database not present in any of the mini-star schemas is added as a dimension table with a relationship to a second table to the star schema if the second table is indicated to have a relationship with the first table in the schema of the database. However, to the extent such a second table is not found, the first table may not be included in any of the mini-stars.

In step 290, schema processor 150 merges the multiple mini-star schemas to generate a star schema. In general, a common dimension table is identified in two mini-star schemas, and the merging is performed by linking the two mini-stars using the common dimension table as a common node. The flowchart then ends in step 299.

As may be appreciated, the joins of retrieval queries identify the relationships that are suitable for inclusion in the star schema and accordingly the relationships are sought to be included in the eventual star schema generated.

The manner in which identification of a star schema in a database is facilitated is described below, with an example.

4. Example Illustration Identification

FIGS. 3A, 3B, 4A, 4B, 5A and 5B together illustrate the manner in which identification of a star schema in a database is facilitated in an embodiment. Each of the figures is described in detail below.

Figure 3A:
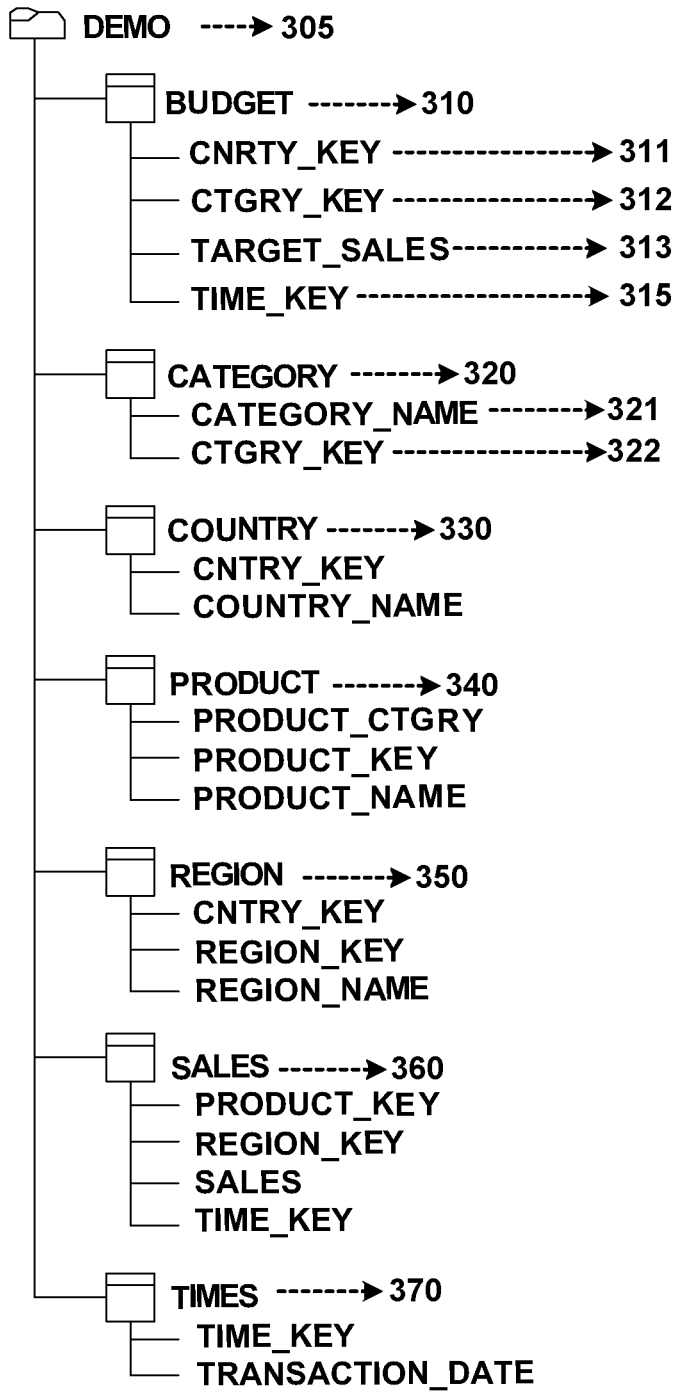
FIG. 3A depicts the various tables existing in a database in an embodiment.

FIG. 3A depicts the various tables existing in a database in an embodiment. Database 305 (labeled "demo") is depicted as containing a budget table 310 (labeled "BUDGET"), a category table 320 (labeled "CATEGORY"), a country table 330 (labeled "COUNTRY"), a product table 340 (labeled "PRODUCT"), a region table 350 (labeled "REGION"), a sales table 360 (labeled "SALES") and a times table 370 (labeled "TIMES").

Budget table 310 is depicted containing columns 311 "CTRY_KEY", 312 "CTGRY_KEY", 313 "TARGET_SALES" and 315 "TIME_KEY". Category table 320 is depicted as containing columns 321 "CATEGORY_NAME" and 322 "CTGRY_KEY".

Similarly, country table 330 is depicted containing columns "CNTRY_KEY" and "COUNTRY_NAME", product table 340 is depicted containing columns "PRODUCT_CTGRY", "PRODUCT_KEY", and "PRODUCT_NAME, region table 350 is depicted containing columns "CNTRY_KEY", "REGION_KEY"and "REGION_NAME", sales table 360 is depicted as containing "PRODUCT_KEY", "REGION_KEY", "SALES" and "TIME_KEY", and times table 370 is depicted as containing columns "TIME_KEY" and "TRANSACTION_DATE".

The database may further contain system/internal data (not shown), which identifies the various relationships between tables. The system data may indicate the primary key and any foreign keys in each table. For each foreign key, a corresponding primary key in another table may also be identified. The presence of a such foreign key and primary key indicates a relationship between the two tables, with the table containing the primary key being termed as a master table and the table with the secondary key being termed as a detail table.

By convention in this example, the primary and corresponding foreign keys are shown with the same column (name). As an illustration, budget table 310 and category table 320 both contain a common column (with the same name "CTGRY_KEY" depicted as column names 312 and 322). The system data may further indicate the existence of a relationship between the two tables. The corresponding relationships for the tables of FIG. 3A is depicted logically in FIG. 3B.

Figure 3B:
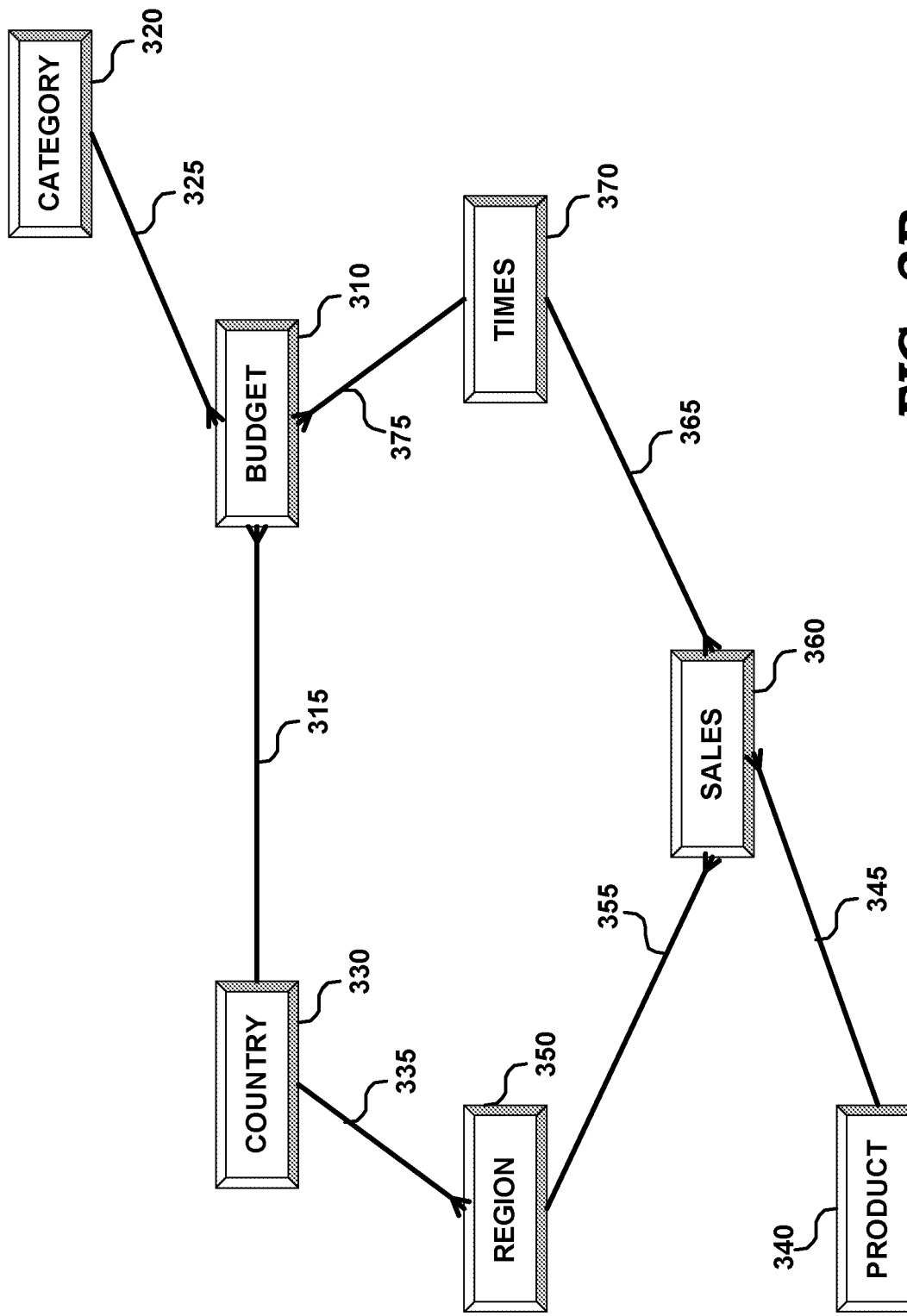
FIG. 3B depicts the relationships existing among various tables in a database in an embodiment.

FIG. 3B depicts the relationships existing among various tables in a database in an embodiment. Each relationship is identified by a line, with one end having single prong and the second end three prongs. Such a line indicates a one-to-many relationship between a master table (single prong) and a detail table (three prongs). However, databases can contain other types of relationships (one-to-one, many-to-many, etc.).

Relationship 325 depicts the relationship between budget table 310 (as the detail table) and category table 320 (as the master table) as described in detail above. Relationship 315 depicts a relationship between country table 330 (as the master table) and budget table 310 (as the detail table) based on a common column "CNTRY_KEY".

Similarly other relationships are depicted (with respective master-detail tables) such as relationships 335 (country table 330-region table 350), 345 (product table 340-sales table 360), 355 (region table 350-sales table 360), 365 (times table 370-sales table 360), and 375 (times table 370-budget table 310).

Schema processor 150 may receive such a schema for a database in step 220 and may be requested to identify a star schema for the database. To facilitate identification, schema processor 150 first identifies mini-star schemas based on received queries of interest as described in detail below.

5. Identifying Mini-Star Schemas

Figure 4B:
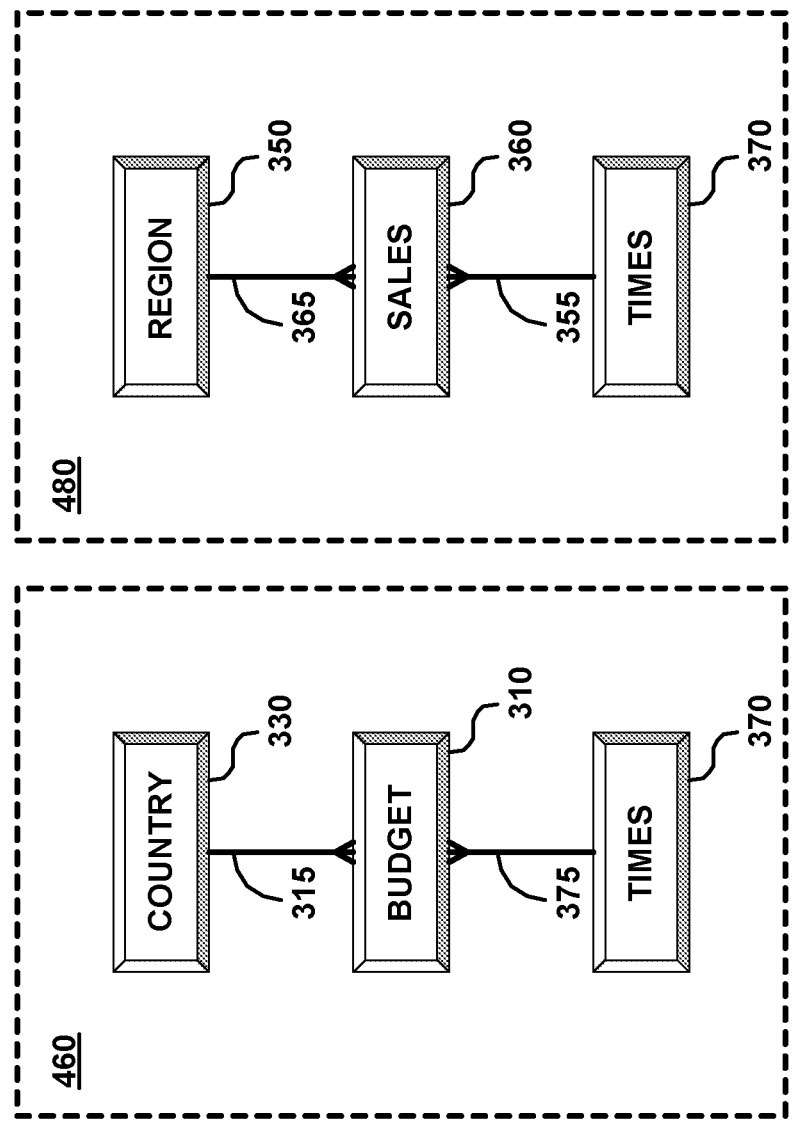
FIG. 4B depicts mini-star schemas identified from received queries of interest in an embodiment.

FIGS. 4A and 4B together illustrate the manner in which mini-star schemas are identified from received queries of interest in a database in an embodiment. Each of the figures is described in detail below.

FIG. 4A depicts example queries executed (or used previously) in a database organized as a normalized schema in an embodiment. Each of lines 421-424 and 441-444 depicts a query of interest received by schema converter 150.

The first query depicted in lines 421-424 contains a join (as specified by "country.ctry_key=budget.cntry_key" in line 423) between country table 330 and budget table 310 and corresponds to relationship 315 depicted in FIG. 3B. The first query also contains another join (as specified by "times.time_key=budget.time_key" in line 423) corresponding to relationship 375 between times table 370 and budget table 310.

Similarly, the second query depicted in lines 441-444 contains a join between sales table 340 and region table 350 and also another join between sales table 340 and times table 370. The relationships (such as 355 and 365) corresponding to the joins are determined and a mini-star schema is identified corresponding to each of the queries as described in detail below.

FIG. 4B depicts mini-star schemas identified from received queries of interest (as depicted in FIG. 4A) in an embodiment. Schema 460 depicts a mini-star schema identified from the relationships (joins) in the first query depicted in line 421-424. Schema 460 contains budget table 310, country table 330, times table 370 and the corresponding relationships 315 and 375 as determined from the joins specified in the first query.

It may be noted that the relationship 315 between budget table 310 and country table 330, and that the relationship 375 between budget table 310 and time table 370 corresponds to the two joins of line 423. It may be further observed that budget table 310 is identified as a fact table, and country table 330 and times table 370 are identified as dimension tables in the mini-star schema.

Similarly schema 480 depicts a mini-star schema identified from the relationships (joins) in the second query depicted in lines 441-444. The mini-star schemas may be merged together to generate a star schema as described in detail below.

6. Merging Mini-Star Schemas

Figure 5A:
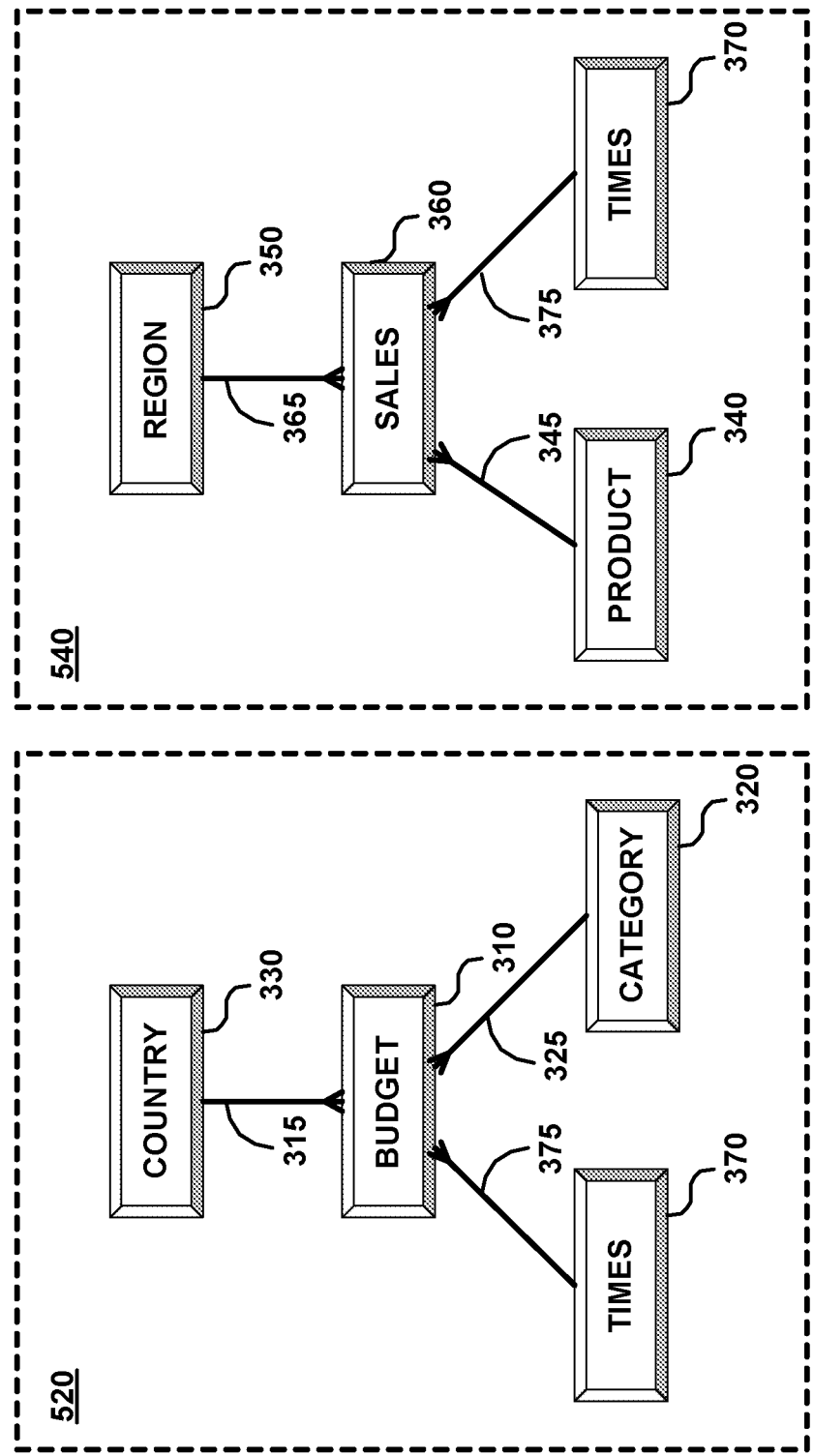
FIG. 5A depicts modified mini-star schemas generated by adding tables to mini-star schemas in an embodiment.
Figure 5B:
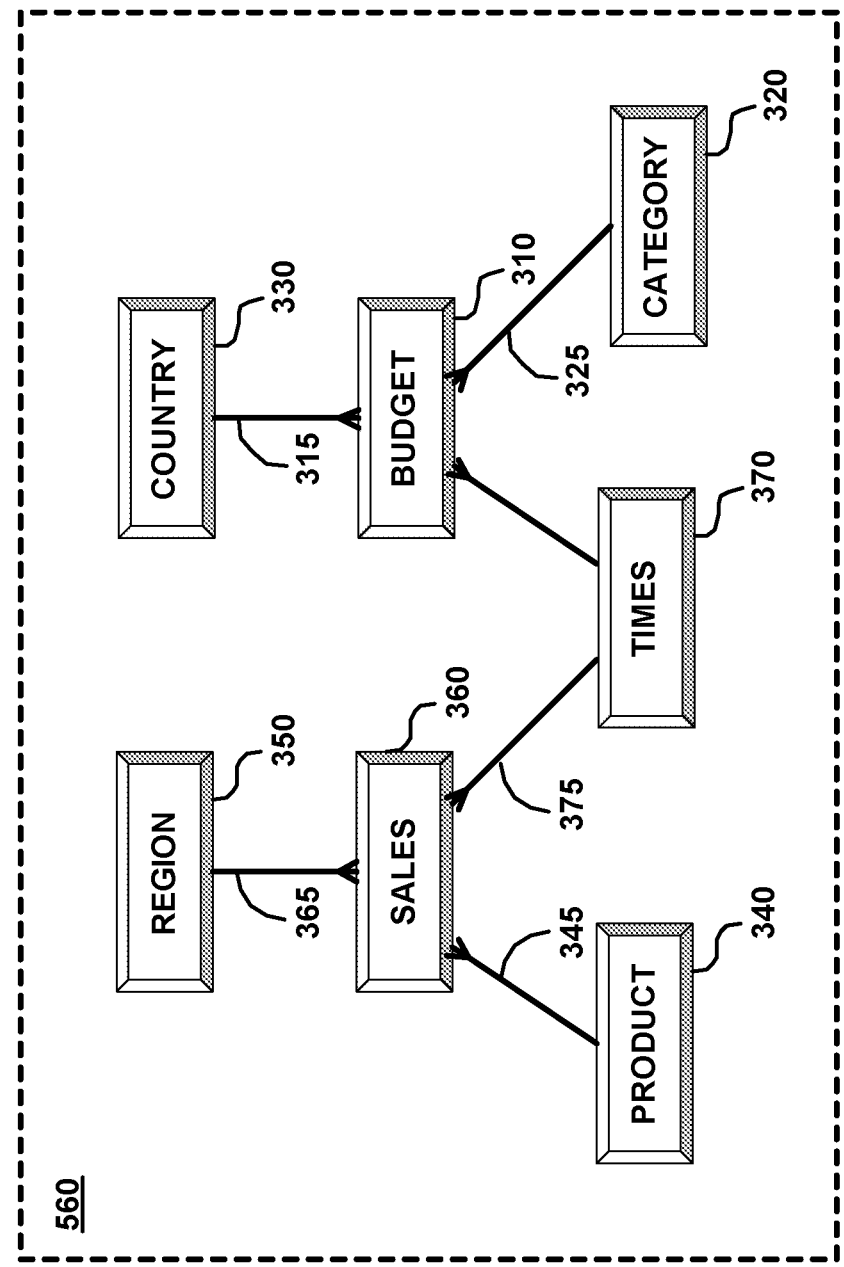
FIG. 5B depicts a star schema generated by merging the mini-star schemas in a database environment in an embodiment.

FIGS. 5A and 5B together illustrate the manner in which mini-star schemas are merged to generate a star schema in an embodiment. Each of the figures is described in detail below.

It may be appreciated that before the mini-star schemas (identified from received queries of interest) are merged, the mini-star schemas may be inspected to determine whether all the tables of the database are present in the mini-star schemas. In the scenario where a table is determined to be absent from the mini-star schemas, the table is added to the mini-star schemas as described in detail below.

FIG. 5A depicts modified mini-star schemas generated by adding tables to mini-star schemas in an embodiment. Schema 520 depicts a mini-star schema that is generated from schema 460 by adding relationship 325 (and thereby category table 320).

As explained above, schema processor 150 inspects the mini-star schemas (schemas 460 and 480) to determine the presence of all the tables in the database. On determining that category table 320 is absent in the identified mini-star schemas (depicted in FIG. 4B), schema converter 150 determines the existence of a relationship (325) in the schema of the database between the absent table (category table 320) and a second table (budget table 310) already present in the mini-star schemas.

In the scenario such a relationship exists, the relationship (325) is added to the mini-star schema containing the second table to generate a modified mini-star schema. Thus, relationship 325 is added to schema 460 to generate schema 520. The newly added (previously absent) table is added as a dimension table in the mini-star schema.

Similarly, relationship 345 (thereby product table 340) is added to schema 480 to generate schema 540. Though all the tables of the database are shown as being included in at least one of the mini-star schemas, it may be appreciated that it may not be possible to include all the tables of the database. Schema processor 150 then proceeds with merging of the modified mini-star schemas as described in detail below.

FIG. 5B depicts a star schema generated by merging the mini-star schemas in a database in an embodiment. It may be observed that the star schema represents the star schema identified in the database whose schema is depicted in FIG. 3B.

Schema 560 depicts a star schema generated by merging the mini-star schemas depicted schemas 520 and 540. Schema processor 150 merges two mini-star schemas (520 and 540) only in the scenario when there is a common dimensional table (times table 370) existing in both of the mini-star schemas. The merging is performed by making the common dimension table as a common node, linking the two mini-star schemas.

Thus, schemas 520 and 540 are merged to generate the star schema depicted in schema 560. It may be observed that schema 560 does not contain relationship 335 depicted in FIG. 3B. It may be further appreciated that different star schemas may be generated depending on the queries of interest received.

Though the description is provided with respect to a simple example for illustration, it will be apparent to one skilled in the relevant arts how to extend the approaches to more complex scenarios. Such complex scenarios may lead to many more tables/relationships, with some of the tables being fact tables and others being dimension tables.

It should be further appreciated that the features described above can be implemented in various embodiments as a desired combination of one or more of hardware, software and firmware. The description is continued with respect to an embodiment in which various features are operative when software instructions are executed.

7. Digital Processing System

Figure 6:
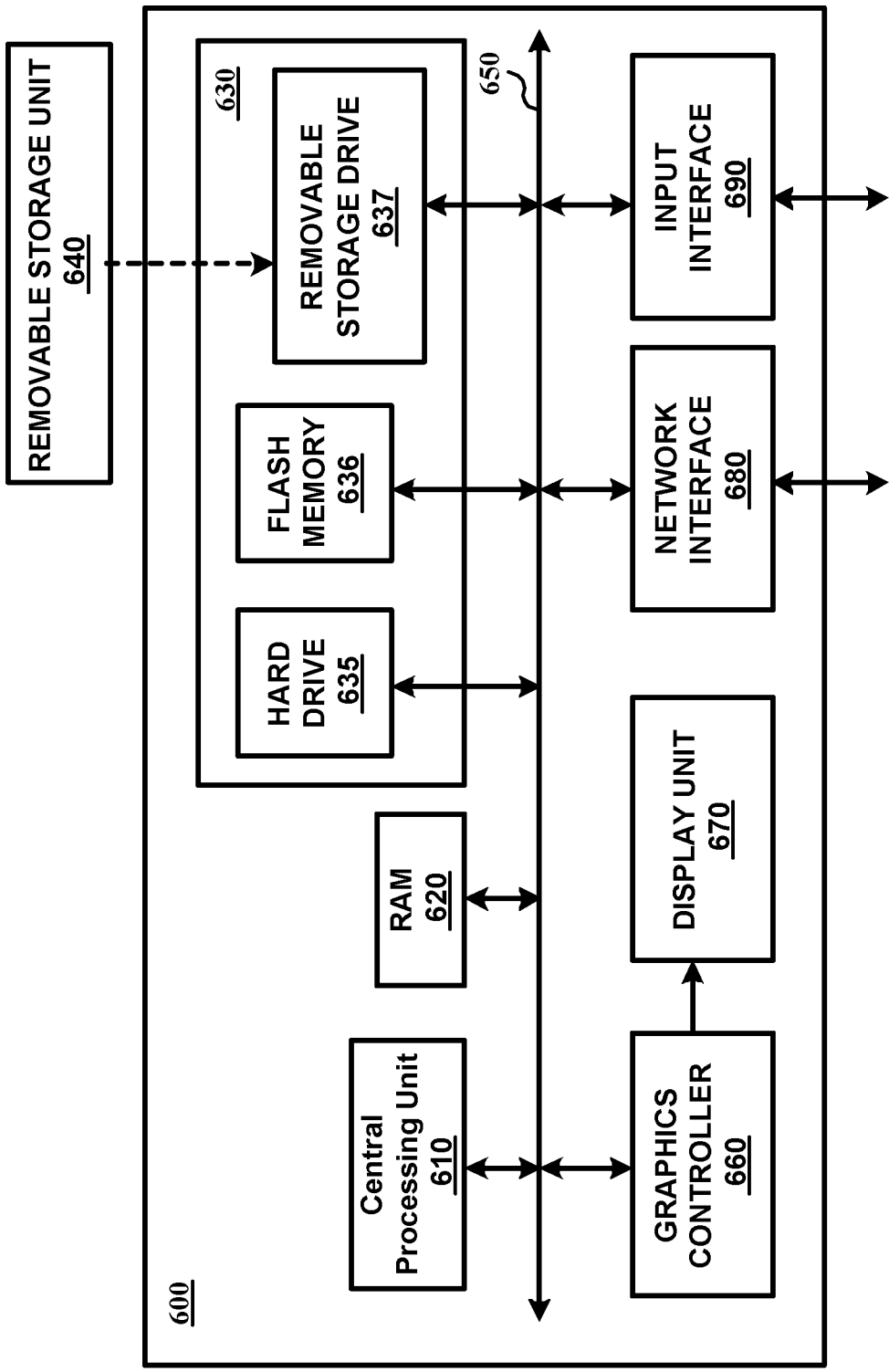
FIG. 6 is a block diagram illustrating the details of digital processing system in which various aspects of the present invention are operative by execution of appropriate software instructions.

FIG. 6 is a block diagram illustrating the details of digital processing system 600 in which various aspects of the present invention are operative by execution of appropriate software instructions. Digital processing system 600 may correspond to schema processor 150. Digital processing system 600 may contain one or more processors (such as a central processing unit (CPU) 610), random access memory (RAM) 620, secondary memory 630, graphics controller 660, display unit 670, network interface 680, and input interface 690. All the components except display unit 670 may communicate with each other over communication path 650, which may contain several buses as is well known in the relevant arts. The components of FIG. 6 are described below in further detail.

CPU 610 may execute instructions stored in RAM 620 to provide several features of the present invention. CPU 610 may contain multiple processing units, with each processing unit potentially being designed for a specific task. Alternatively, CPU 610 may contain only a single general purpose processing unit. RAM 620 may receive instructions from secondary memory 630 using communication path 650.

Graphics controller 660 generates display signals (e.g., in RGB format) to display unit 670 based on data/instructions received from CPU 610. Display unit 670 contains a display screen to display the images defined by the display signals. Input interface 690 may correspond to a keyboard and a pointing device (e.g., touch-pad, mouse). Network interface 680 provides connectivity to a network (e.g., using Internet Protocol), and may be used to communicate with others connected systems (e.g., to receive schema of the database and queries of interest from database server 160) of FIG. 1.

Secondary memory 630 may contain hard drive 635, flash memory 636, and removable storage drive 637. Secondary memory 630 may store the data (e.g., meta-data describing the tables and relationships depicted in FIGS. 3A, 3B, 4A, 4B, 5A and 5B) and software instructions, which enable system 600 to provide several features in accordance with the present invention. Groups of software instructions (for example, in compiled/object form or post-linking in a form suitable for execution by CPU 610) are termed as code, Some or all of the data and instructions may be provided on removable storage unit 640, and the data and instructions may be read and provided by removable storage drive 637 to CPU 610. Floppy drive, magnetic tape drive, CD-ROM drive, DVD Drive, Flash memory, removable memory chip (PCMCIA Card, EPROM) are examples of such removable storage drive 637.

Removable storage unit 640 may be implemented using medium and storage format compatible with removable storage drive 637 such that removable storage drive 637 can read the data and instructions. Thus, removable storage unit 640 includes a computer readable storage medium having stored therein computer software and/or data. However, the computer readable storage medium can be in other forms (e.g., non-removable, random access, etc.).

While the computer readable medium is shown being provided from within the digital processing system of FIG. 6 for illustration, it should be appreciated that the computer readable medium can be provided external to the digital processing system as well (and the corresponding data/instructions retrieved over a network). Furthermore, though the features are described above with respect to a stand-alone computer system merely for illustration, it should be understood that the various features could be implemented on a combination of systems communicating via a network or other communication paths.

In this document, the term "computer program product" is used to generally refer to removable storage unit 640 or hard disk installed in hard drive 635. These computer program products are means for providing software to system 600. CPU 610 may retrieve the software instructions, and execute the instructions to provide various features of the present invention described above.

8. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents. Also, the various aspects, features, components and/or embodiments of the present invention described above may be embodied singly or in any combination in a data storage system such as a database system.

What is claimed is:

1. A non-transitory computer readable storage medium storing one or more sequences of instructions for causing a system to facilitate identification of a star schema defining a structure for storing a desired data in a data warehouse, said desired data being already stored in a database organized as a normalized schema, wherein said normalized schema of said database defines a plurality of tables in said database, wherein execution of said one or more sequences of instructions by one or more processors contained in said system causes said system to perform the actions of:

receiving a first query and a second query directed to said database organized as said normalized schema;

examining said first query to determine a first join of a first table and a second table, wherein said first table and said second table are contained in said plurality of tables, and wherein said first join is according to said normalized schema, wherein said examining also examines said second query to determine a third join of a seventh table and an eighth table, wherein said seventh table and said eighth table are contained in said plurality of tables, wherein said third join is according to said normalized schema; and forming said star schema for said data warehouse by including a first relationship associating said first table and said second table in said star schema based on said examining of said first query in response to said receiving said first query, said forming also including a sixth relationship associating said seventh table and said eighth table in said star schema based on said examining of said second query in response to said receiving of said second query, whereby said star schema includes both of said first relationship and said sixth relationship.

2. The non-transitory computer readable medium of claim 1, wherein said examining examines said first query to further determine a second join of said second table and a third table, wherein said second join is according to said normalized schema, further comprising more instructions for:

including a second relationship associating said second table and said third table in said star schema; and identifying said second table as a fact table and said first table and said third table as dimension tables in said star schema based on determination of said first join and said second join in said first query directed to said database.

3. The non-transitory computer readable medium of claim 2, further comprising more instructions for:

identifying a fourth table contained in said plurality of tables, but not yet included in said star schema, by inspecting said normalized schema;

determining a fifth table in said star schema having a relationship with said fourth table in said normalized schema by inspecting said normalized schema; and adding a fourth relationship associating said forth table and said fifth table in said star schema in response to said determining said fifth table, wherein said identifying of said fourth table, said determining and said adding are performed after said examining.

4. The non-transitory computer readable medium of claim 3, further comprising more instructions for merging a first mini-star with a second mini-star, wherein said first mini-star contains said first relationship, said second relationship and said fourth relationship, wherein said merging comprises:

finding a common dimension table in both of said first mini-star and said second mini-star; and linking said first mini-star with said second mini-star using said common dimension table as a single node in response to said finding said common dimension table.

5. A method of managing data, said method comprising:

storing data of interest in a database organized as a plurality of tables specified according to a normalized schema, wherein said normalized schema of said database also indicates a structure of each of said plurality of tables and a plurality of relationships existing among said plurality of tables in said database;

receiving a plurality of queries directed to said database organized as said normalized schema, wherein each of said plurality of queries specifies a corresponding one of a plurality of subset of relationships, said subset of relationships being contained in said plurality of relationships;

identifying a star schema by including said plurality of subset of relationships in response to said receiving and by examining said plurality of queries;

organizing a data warehouse according to a second structure defined by said star schema; and after said organizing, copying data of interest previously stored in said database to said data warehouse organized as said star schema, wherein said copying is performed after said receiving and said identifying also.

6. The method of claim 5, wherein said generating further comprises:

identifying a plurality of mini-star schemas corresponding to said plurality of queries, wherein each of said plurality of mini-star schemas includes said subset of relationships specified in one of said plurality of queries directed to said database organized as said normalized schema; and merging said plurality of mini-star schemas to generate said star schema.

7. The method of claim 6, wherein said identifying further comprises:

determining a first table not existing in said plurality of mini-star schemas and a second table existing in said plurality of mini-star schemas, wherein said first table and said second table are contained in said plurality of tables; and adding a new relationship to one of said plurality of mini-star schemas, said new relationship existing between said first table and said second table according to said normalized schema, wherein said new relationship is contained in said plurality of relationships.

8. The method of claim 6, wherein merging a first mini-star schema with a second mini-star schema is performed only if there is a common table existing in said first mini-star schema and said second mini-star schema, wherein said first mini-star schema and said second mini-star schema are contained in said plurality of mini-star schemas.

9. The method of claim 5, wherein each of said subset of relationships is specified by a corresponding join in the corresponding query according to said normalized schema.

10. A digital processing system for managing data, said digital processing system comprising:

a memory to store a plurality of instructions;

and one or processors to execute said plurality of instructions, which causes said digital processing system to perform the actions of:

storing data of interest in a database organized as a plurality of tables specified according to a normalized schema, wherein said normalized schema of said database also indicates a structure of each of said plurality of tables and a plurality of relationships existing among said plurality of tables in said database;

examining a plurality of queries directed to said database organized as said normalized schema, wherein each of said plurality of queries specifies a corresponding one of a plurality of subset of relationships, said subset of relationships being contained in said plurality of relationships;

identifying a star schema by including said plurality of subset of relationships based on said examining said plurality of queries; organizing a data warehouse according to a second structure defined by said star schema; and after said organizing, copying data of interest previously stored in said database to said data warehouse organized as said star schema, wherein said copying is performed after said examining and said identifying also.

11. The digital processing system of claim 10, wherein said generating further comprises:

identifying a plurality of mini-star schemas corresponding to said plurality of queries, wherein each of said plurality of mini-star schemas includes said subset of relationships corresponding to one of said plurality of queries; and merging said plurality of mini-star schemas to generate said star schema.

12. The digital processing system of claim 11, wherein said identifying further comprises:
   determining a first table not existing in said plurality of mini-star schemas and a second table existing in said plurality of mini-star schemas, wherein said first table and said second table are contained in said plurality of tables; and
   adding a new relationship to one of said plurality of mini-star schemas, said new relationship existing between said first table and said second table according to said normalized schema, wherein said new relationship is contained in said plurality of relationships.

13. The digital processing system of claim 11, wherein said merging a first mini-star schema with a second mini-star schema is performed only if there is a common table existing in said first mini-star schema and said second mini-star schema, wherein said first mini-star schema and said second mini-star schema are contained in said plurality of mini-star schemas.

14. The digital processing system of claim 10, wherein each of said subset of relationships is specified by a corresponding join in the corresponding query according to said normalized schema.

15. The digital processing system of claim 10, wherein said actions further comprise:
   receiving a request to identify a star schema for said database,
   wherein said examining, said identifying, and said organizing are performed in response to receiving said request.

16. The digital processing system of claim 15, wherein some of said plurality of queries are received prior to receiving of said request, whereby said star schema is identified based on at least some queries received prior to said request.

* * * * *